US011379570B2

(12) United States Patent
Jammalamadaka et al.

(10) Patent No.: US 11,379,570 B2
(45) Date of Patent: Jul. 5, 2022

(54) ENABLING SINGLE FINGER TAP USER AUTHENTICATION AND APPLICATION LAUNCH AND LOGIN USING FINGERPRINT SCANNING ON A DISPLAY SCREEN

(71) Applicant: International Business Machines Corporation, Armonk, NY (US)

(72) Inventors: Manohar V. R. Jammalamadaka, Sunnyvale, CA (US); Venkata S. Kappagantu, Fremont, CA (US); Lalith K. Maddali, Fremont, CA (US); Takaomi Migimatsu, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 16/397,136

(22) Filed: Apr. 29, 2019

(65) Prior Publication Data

US 2019/0258790 A1   Aug. 22, 2019

Related U.S. Application Data

(63) Continuation of application No. 15/451,560, filed on Mar. 7, 2017, now Pat. No. 10,360,359.

(51) Int. Cl.
*G06F 21/00* (2013.01)
*G06F 21/32* (2013.01)
(Continued)

(52) U.S. Cl.
CPC ............ *G06F 21/32* (2013.01); *G06F 1/1626* (2013.01); *G06F 1/1637* (2013.01);
(Continued)

(58) Field of Classification Search
None
See application file for complete search history.

(56) References Cited

U.S. PATENT DOCUMENTS 6,320,974 B1 * 11/2001 Glaze ..................... G07C 9/37
382/118
7,486,810 B1 * 2/2009 Accapadi ............... G06F 21/32
382/124
(Continued)

FOREIGN PATENT DOCUMENTS

CN    103473000 A    12/2013
CN    103927019 A    7/2014
(Continued)

OTHER PUBLICATIONS

Buduru, Arun Balaji; Yau, Stephen S. An Effective Approach to Continuous User Authentication for Touch Screen Smart Devices. 2015 IEEE International Conference on Software Quality, Reliability and Security. https://ieeexplore.ieee.org/stamp/stamp.jsp?tp=&arnumber=7272936 (Year: 2015).*
(Continued)

*Primary Examiner* — Jeremiah Lavery
(74) *Attorney, Agent, or Firm* — Yee & Associates, P.C.

(57) ABSTRACT

Single tap launch and login to a secure application is provided. User authentication information is verified based on fingerprint data in response to the data processing system receiving an input via a finger of a user on a display screen to execute the secure application. The user authentication information is passed to the secure application as an invoking parameter to execute the secure application. Content corresponding to the secure application is received in response to execution of the secure application.

14 Claims, 5 Drawing Sheets

(51) Int. Cl.
  *G06F 3/04817* (2022.01)
  *G06F 1/16* (2006.01)
  *G06F 3/04883* (2022.01)
  *G06V 40/13* (2022.01)
  *G06V 40/12* (2022.01)

(52) U.S. Cl.
  CPC ........ *G06F 1/1684* (2013.01); *G06F 3/04817* (2013.01); *G06F 3/04883* (2013.01); *G06V 40/13* (2022.01); *G06V 40/1365* (2022.01); *G06F 2203/0338* (2013.01)

(56) References Cited

U.S. PATENT DOCUMENTS

| | | | |
|---|---|---|---|
| 9,195,388 | B2 | 11/2015 | Shepherd et al. |
| 9,542,783 | B2 * | 1/2017 | Slaby .................... G06F 21/45 |
| 9,977,887 | B2 * | 5/2018 | Bengtsson ............ G06V 40/13 |
| 2008/0263363 | A1 * | 10/2008 | Jueneman ............... G06F 21/32 713/184 |
| 2010/0011222 | A1 * | 1/2010 | Fiske ...................... G06F 21/46 713/184 |
| 2010/0138914 | A1 * | 6/2010 | Davis .................. H04L 63/0853 726/19 |
| 2010/0158327 | A1 * | 6/2010 | Kangas .................. G06V 10/75 382/124 |
| 2012/0200601 | A1 * | 8/2012 | Osterhout ............ G02B 27/017 345/633 |
| 2013/0251214 | A1 * | 9/2013 | Chung .................. H04N 5/225 382/116 |
| 2014/0162598 | A1 * | 6/2014 | Villa-Real ............. G08B 7/068 455/411 |
| 2014/0189608 | A1 | 7/2014 | Shuttleworth et al. |
| 2016/0342826 | A1 * | 11/2016 | Apostolos ........... H04W 12/065 |
| 2017/0124328 | A1 * | 5/2017 | Krishnapura ........... G06F 21/57 |
| 2017/0147865 | A1 * | 5/2017 | Jensen ................. G06V 10/141 |
| 2017/0220843 | A1 * | 8/2017 | Apostolos ........... H04W 12/065 |
| 2018/0260544 | A1 | 9/2018 | Jammalamadaka et al. |

FOREIGN PATENT DOCUMENTS

| | | |
|---|---|---|
| CN | 105204904 A | 12/2015 |
| CN | 106033507 A | 10/2016 |

OTHER PUBLICATIONS

Alariki, Ala Abdulhakim et al. A study of touching behavior for authentication in touch screen smart devices. 2016 International Conference on Intelligent Systems Engineering (ICISE). https://ieeexplore.ieee.org/stamp/stamp.jsp?tp=&arnumber=7475123 (Year : 2016).*

Patel, Vishal M. et al. Screen Fingerprints: A Novel Modalityfor Active Authentication. IT Professional, vol. 15, Issue: 4. pp. 38-42. https://ieeexplore.ieee.org/stamp/stamp.jsp?tp=&arnumber=6559984 (Year: 2013).*

"Unlock Your Screen and Open an App with LockScreen One Touch-Android App Review", YouTube, Sep. 10, 2013, 1 page. https://www.youtube.com/watch?v=E4k0OFFa4Us.

"Launch Any Android App Directly from Your Secure Lock Screen [How-To]", YouTube, Jul. 30, 2014, 1 page, https://www.youtube.com/watch?v=Bc4Wzfw33wM.

Baladad, "Assign Apps Individual PINs & Passwords to Quick Launch Them from Your Lock Screen", WonderHowto, Inc., Jul. 30, 2014, 7 pages, https://gs3.gadgethacks.com/how-to/assign-apps-individual-pins-passwords-quick-launch-them-from-your-lock-screen-0156248/.

Broussard, "How to Use iOS 10's Redesigned Lock Screen", MacRumors.com, LLC., Sep. 13, 2016, 4 pages, https://www.macrumors.com/how-to/ios-10-lock-screen/.

Campbell, "Apple patents fingerprint sensor that works through displays, hints at 'iPhone 8' tech", AppleInsider, Oct. 4, 2016, 3 pages. http://appleinsider.com/articles/16/10/04/apple-patents-fingerprint-sensor-that-works-through-displays-hints-at-iphone-8-tech.

Hoeksma et al., "Touch ID plugin with saving password in keychain for IOS and android: cordova-plugin-keychain-touch-id", GitHub, Inc., dated Dec. 22, 2016, 3 pages, https://github.com/sjhoeksma/cordova-plugin-keychain-touch-id.

McCormick, "LG's new fingerprint reader sits under a smartphone screen", Vox Media, Inc., May 1, 2016, 2 pages. http://www.theverge.com/circuitbreaker/2016/5/1/11553830/lg-fingerprint-sensor-under-glass-screen.

Verbruggen, "Forget passwords, use a fingerprint scanner! Cordova TouchID Plugin", GitHub, Inc., dated May 30, 2016, 4 pages. https://github.com/EddyVerbruggen/cordova-plugin-touch-id.

Yang et al., "TapLock: Exploit Finger Tap Events for Enhancing Attack Resilience of Smartphone Passowrds", 2015 IEEE International Conference of Communications, 6 pages.

Liang et al., "User Authentication Interfaces in Mobile Devices: Some Design Considerations." 2014 IEEE International Conference on Computational Science and Engineering, 4 pages.

Office Action, dated Aug. 28, 2018, regarding U.S. Appl. No. 15/451,560, 21 pages.

Notice of Allowance, dated Mar. 13, 2019, regarding U.S. Appl. No. 15/451,560, 8 pages.

List of IBM Patents and Applications Treated as Related, dated Apr. 29, 2019, 2 pages. (Appendix P).

\* cited by examiner

ENABLING SINGLE FINGER TAP USER AUTHENTICATION AND APPLICATION LAUNCH AND LOGIN USING FINGERPRINT SCANNING ON A DISPLAY SCREEN

BACKGROUND

1. Field

The disclosure relates generally to fingerprint recognition technology and more specifically to enabling a single on display screen finger contact to authenticate a user of an electronic device, unlock the electronic device, and launch and login to a secure application in parallel using a whole display screen fingerprint scanner of the electronic device.

2. Description of the Related Art

Today, considerable interest exists in providing electronic devices, which may include smart phones, cellular phones, smart watches, desktop computers, laptop computers, handheld computers, such as tablets, smart televisions, gaming devices, and the like, with various means to secure data on these devices. Biometric security systems are one approach to providing data security and privacy on these devices. Fingerprints are one form of biometrics used to identify individuals and verify their identity. Fingerprint recognition systems generally collect fingerprint image samples and compare those image samples against a database of stored fingerprint templates. In addition, fingerprint scanners are becoming increasingly ubiquitous in electronic device designs.

Furthermore, application user authentication and data security is continuously evolving. However, tension exists between increasing ease of electronic device use and protecting a user's data privacy. Currently, it requires several user interactions with an electronic device to successfully login to a secure application, such as a banking application, when using current fingerprint recognition technology.

SUMMARY

According to one illustrative embodiment, a computer-implemented method for providing single tap launch and login to a secure application is provided. A data processing system verifies user authentication information based on fingerprint data in response to the data processing system receiving an input via a finger of a user on a display screen to execute the secure application. The data processing system passes the user authentication information to the secure application as an invoking parameter to execute the secure application. The data processing system receives content corresponding to the secure application in response to execution of the secure application. According to other illustrative embodiments, a data processing system and computer program product for providing single tap launch and login to a secure application are provided.

DETAILED DESCRIPTION

Figure 1:
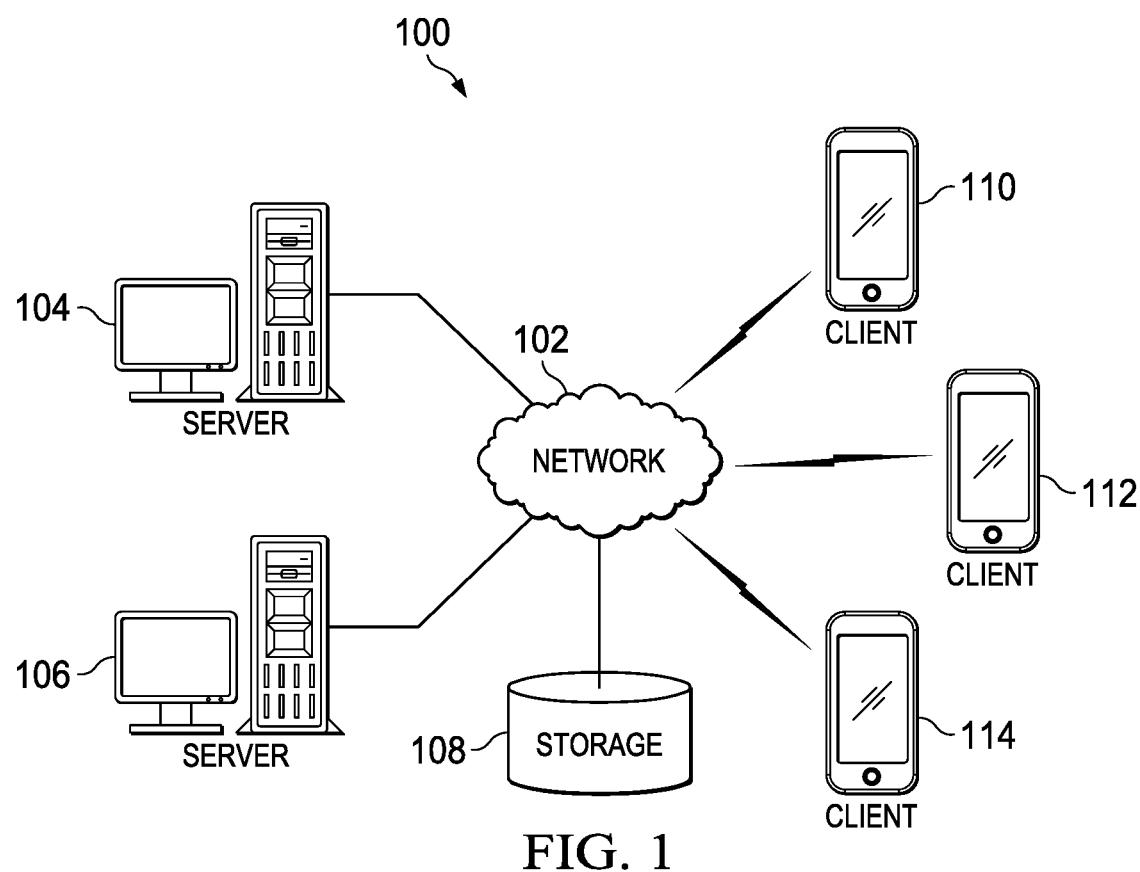
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide secure services, such as, for example, secure banking services, secure financial services, secure healthcare services, secure transaction services, and the like, to client devices. Also, it should be noted that server 104 and server 106 may each represent a plurality of different servers providing a plurality of different secure services. Furthermore, other servers connected to network 102 may provide communication services, such as, for example, voice and text communications between client devices.

Client 110, client 112, and client 114 also connect to network 102. Clients 110, 112, and 114 are clients of server 104 and server 106. Further, server 104 and server 106 may provide information, such as software applications and application updates to clients 110, 112, and 114.

In this example, clients 110, 112, and 114 are illustrated as mobile electronic devices, such as smart phones or cellular telephones, with wireless communication links to network 102. However, it should be noted that clients 110, 112, and 114 are meant as examples only. In other words, clients 110, 112, and 114 may include other types of data processing systems, such as, for example, desktop or personal computers, laptop computers, handheld tablet computers, smart watches, smart televisions, gaming devices, and the like, with wire or wireless communication links to network 102. In addition, clients 110, 112, and 114 are electronic devices that include display screens with touch screen capabilities. Users of clients 110, 112, and 114 may utilize applications loaded on clients 110, 112, and 114 to access and utilize the secure services provided by server 104 and server 106.

Storage 108 is a network storage device capable of storing any type of data in a structured format or an unstructured format. In addition, storage 108 may represent a set of one or more network storage devices. Storage 108 may store, for example, names and identifiers for a plurality of different client device users; fingerprint biometric templates corresponding to each of the different client device users; secure applications corresponding to a plurality of different secure services, operating system images with user authentication managers, and the like. Further, storage 108 may store other data, such as authentication or credential data that may include user names, passwords, and other types of biometric data associated with the client device users and system administrators, for example.

In addition, it should be noted that network data processing system 100 may include any number of additional server devices, client data processing system devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

Figure 2:
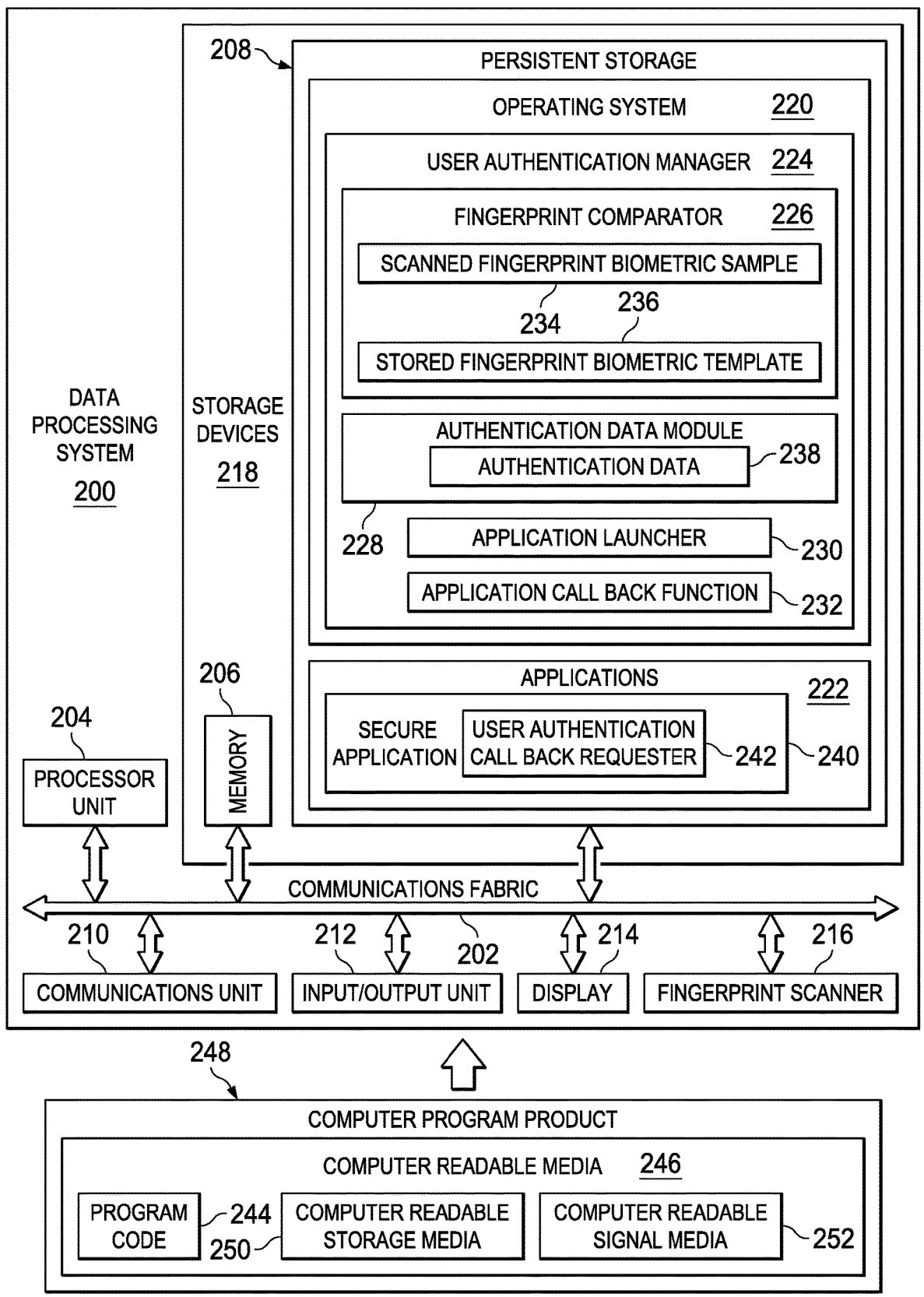
FIG. 2 is a diagram of a data processing system in which illustrative embodiments may be implemented.

With reference now to FIG. 2, a diagram of a data processing system is depicted in accordance with an illustrative embodiment. Data processing system 200 is an example of an electronic device, such as client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, display 214, and fingerprint scanner 216.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores operating system 220 and applications 222. Applications 222 represent a plurality of different software application programs, which provide a plurality of different functions, on data processing system 200. Operating system 220 directs operations of data processing system 200, controls and schedules execution of applications 222, and manages storage devices 218, input/output unit 212, and communications unit 210, for example. Also, it should be noted that operating system 220 may be a mobile operating system. A mobile operating system is specifically designed to run on mobile electronic devices, such as cellular telephones, smart phones, smart watches, personal digital assistants, tablet computers, and other handheld mobile devices.

In this example, operating system 220 includes user authentication manager 224. User authentication manager 224 authenticates a user of data processing system 200 via a finger of the user contacting any location on display 214 using fingerprint scanner 216, unlocks data processing system 200, and launches and logs in to a secure application corresponding to an icon at a location where the user's finger contacted display 214. User authentication manager 224 performs all three of these actions substantially at a same time in parallel.

Further, it should be noted that even though user authentication manager 224 is illustrated as residing in operating system 220, in an alternative illustrative embodiment user authentication manager 224 may be a separate component of data processing system 200. For example, user authentication manager 224 may be a secure hardware component coupled to communication fabric 202 or a combination of secure hardware and software components.

In this example, user authentication manager 224 includes fingerprint comparator 226, authentication data module 228, application launcher 230, and application call back function 232. However, it should be noted that user authentication manager 224 may include more or fewer components than shown. For example, different illustrative embodiments may combine two or more components into one component, divide one component into two or more components, or add other components not shown.

User authentication manager 224 utilizes fingerprint comparator 226 to compare scanned fingerprint biometric sample 234, which was captured by fingerprint scanner 216, with stored fingerprint biometric template 236, which corresponds to an authorized user of data processing system 200. If fingerprint comparator 226 determines that scanned fingerprint biometric sample 234 matches stored fingerprint biometric template 236, then fingerprint comparator 226 verifies or authenticates the identity of the user. In response to fingerprint comparator 226 authenticating the identity of the user, authentication data module 228 retrieves authentication data 238, which corresponds to the user, from persistent storage 208. Authentication data 238 may be, for example, stored information, such as biometric information, user name information, password information, passcode information, or any combination thereof. Alternatively, authentication data module 228 may generate authentication data 238. Authentication data module 228 provides authentication data 238 to application launcher 230 and/or application call back function 232.

User authentication manager 224 utilizes application launcher 230 to launch and login to secure application 240. Application launcher 230 utilizes authentication data 238 as an invoking parameter to open and execute secure application 240. Secure application 240 represents a software application program having restricted access, which requires user authentication to access.

User authentication manager 224 utilizes application call back function 232 to send authentication data 238 to secure application 240 in response to user authentication call back requester 242 registering a request with application call back function 232 for authentication data 238. After receiving authentication data 238, secure application 240 may utilize authentication data 238 to, for example, automatically login to a network server to receive user-personalized content corresponding to secure application 240. Secure application 240 may be, for example, a banking application for retrieving bank account balance information corresponding to the authenticated user.

Communications unit 210, in this example, provides for communication with other computers, data processing systems, and client devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user and includes touch screen capabilities to allow the user to make on-screen selections through user interfaces or input data, for example.

Fingerprint scanner 216 is a device that generates a digital image of a user's fingerprint corresponding to a finger of the user. It should be noted that as used herein, the term finger may also refer to a thumb. Fingerprint scanner 216 is a whole or full display screen fingerprint scanner. In other words, fingerprint scanner 216 is capable of scanning a fingerprint anywhere the user contacts or touches display 214 with a finger. Data processing system 200 utilizes fingerprint scanner 216 to verify an identity of the user. Fingerprint recognition or fingerprint authentication refers to verifying a match between scanned fingerprint biometric sample 234 and stored fingerprint biometric template 236 corresponding to the user.

Instructions for operating system 220, applications 222, and/or programs may be located in storage devices 218, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that existing methods require a user to open an application and then use fingerprint recognition technology to authenticate the user prior to the user using the application. Illustrative embodiments reduce the number of user interactions with an electronic device to open and log in to an application. For example, illustrative embodiments, in parallel, authenticate the electronic device user via a display screen finger tap of the user, unlock the electronic device, and launch and login to the application. However, it should be noted that illustrative embodiments may send authenticate data as an invoking parameter to execute the application from a locked display screen, without unlocking the electronic device. For example, illustrative embodiments may allow a user to make a payment via a financial application using a single finger tap on a locked display screen to launch and login to the financial application only, while not unlocking the electronic device. Thus, illustrative embodiments provide ease of use of electronic device applications and faster response times by performing user authentication in parallel with application launching. Furthermore, illustrative embodiments eliminate a need for additional hardware or buttons that take up valuable real estate on electronic devices, such as, for example, smart phones and smart watches.

Illustrative embodiments utilize a fingerprint scanner capable of capturing biometric fingerprint samples through a display screen of an electronic device. In addition, illustrative embodiments utilize a full or whole display screen fingerprint scanner located subjacent to the display screen. Thus, illustrative embodiments improve ease of application use with one tap user authentication.

For example, in response to a user tapping on an application icon on a display screen of an electronic device, an operating system of the electronic device reads the fingerprint information, which was captured on the display screen at the location where the user touched the display screen, to authenticate the user. In parallel, the operating system launches the application. Further, the operating system provides a user authentication call back notification to the application as soon as the operating system authenticates the user. The application may display a general notification popup screen to the user as soon as the operating system launches the application. Furthermore, the application registers a user authentication call back request with the operating system so that the operating system will notify the application when the operating system verifies the identity of the user. Upon user authentication, the operating system logs in to the application using authentication data and the application displays the appropriate content.

As a result, illustrative embodiments do not require the user to have the fingerprint scanned a second time to access the application content. For example, illustrative embodiments provide user authentication specific to an application, such as a banking application, which may require user authentication after the electronic device already authenticated the user. Illustrative embodiments eliminate this second user authentication step by enabling a single user authentication via the operating system authorizing the application.

Moreover, illustrative embodiments may decrease power (e.g., battery) consumption and processor usage of an electronic device by scanning for a fingerprint at predefined time intervals instead of continuously when the user contacts the display screen. Alternatively, illustrative embodiments may scan for a fingerprint to authenticate a user only after an action by the user requires the operating system to invoke an application. In addition, in response to a user swiping to unlock from a home screen (e.g., opens a notification), illustrative embodiments not only unlock the electronic device (e.g., smart phone), but also authenticate the user to the application as well. Further, in response to a user tapping on an application shortcut displayed on a locked screen, illustrative embodiments unlock the electronic device from lock screen and login to the application corresponding to the application shortcut. Furthermore, in response to a user tapping on an application icon when the electronic device is already unlocked, illustrative embodiments open the application with login information already verified so that there is no need for scanning the user's fingerprint a second time.

Figure 3:
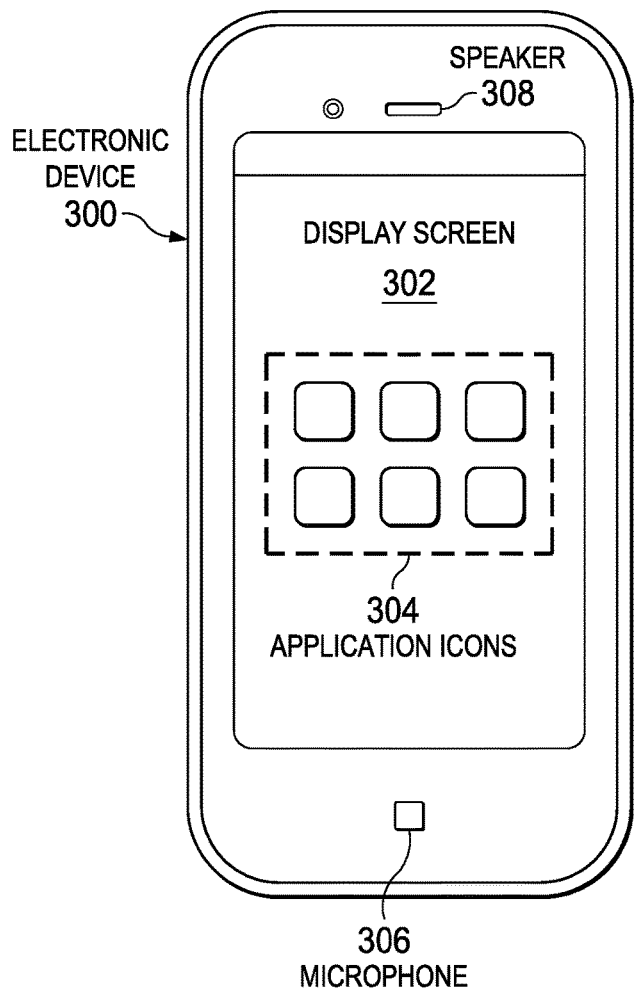
FIG. 3 is a diagram illustrating an example of an electronic device in accordance with an illustrative embodiment.

With reference now to FIG. 3, a diagram illustrating an example of an electronic device is depicted in accordance with an illustrative embodiment. Electronic device 300 is a system of software and hardware components for authenticating a user of electronic device 300, unlocking electronic device 300, and launching and logging into a secure application at substantially a same time in parallel via finger contact of the user on display screen 302. Electronic device 300 may be implemented in a data processing system, such as data processing system 200 in FIG. 2.

In this example, electronic device 300 is shown as a mobile communication device, such as a cellular telephone or smart phone. However, it should be noted that electronic device 300 is only meant as an example and not as a limitation on illustrative embodiments. In other words, electronic device 300 may include other types of electronic devices, such as, for example, a smart watch, a desktop computer, a laptop computer, a handheld computer, a smart television, a gaming device, and the like.

Electronic device 300 includes display screen 302, which has touch screen capabilities. Display screen 302 may be, for example, display 214 in FIG. 2. Also, it should be noted that electronic device 300 includes a whole display screen fingerprint scanner, such as fingerprint scanner 216 in FIG. 2, located underneath display screen 302. The whole display screen fingerprint scanner captures a biometric fingerprint sample when a finger of the user contacts any portion of display screen 302.

Electronic device 300 utilizes display screen 302 to display information to the user of electronic device 300. In this example, display screen 302 displays application icons 304 to the user. Application icons 304 correspond to a plurality of different applications, such as, for example, applications 222 in FIG. 2.

In response to the user selecting an application icon in application icons 304 by contacting display screen 302 at a location of the selected application icon, electronic device 300 utilizes the whole display screen fingerprint scanner to capture a biometric fingerprint sample of the user. The selected application icon may correspond to a secure application, such as secure application 240 in FIG. 2, which may be a banking application, for example. Electronic device 300 utilizes the captured biometric fingerprint sample to authenticate the user and, in parallel, to launch and login to the application corresponding to the selected application icon.

In this example, electronic device 300 also includes microphone 306 and speaker 308. However, it should be noted that electronic device 300 may include other components not shown, such as, for example, a camera, a device power on button, and the like.

Figure 4:
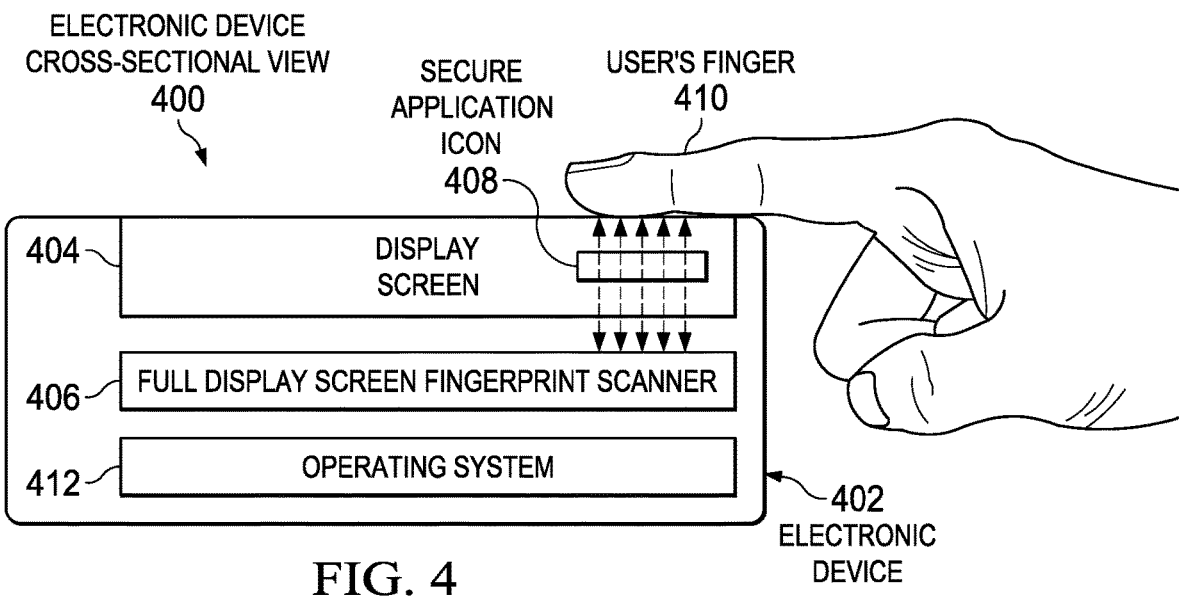
FIG. 4 is a diagram illustrating an electronic device cross-sectional view in accordance with an illustrative embodiment.

With reference now to FIG. 4, a diagram illustrating an electronic device cross-sectional view is depicted in accordance with an illustrative embodiment. Electronic device cross-sectional view 400 illustrates a cross-section of electronic device 402. Electronic device 402 may be, for example, client 110 in FIG. 1, data processing system 200 in FIG. 2, or electronic device 300 in FIG. 3.

Electronic device 402 includes display screen 404 and full display screen fingerprint scanner 406. Display screen 404 may be, for example, display screen 302 in FIG. 3. Full display screen fingerprint scanner 406 may be, for example, fingerprint scanner 216 in FIG. 2.

In this example, display screen 404 displays secure application icon 408. However, it should be noted that display screen 404 may display a plurality of different application icons and other images. Secure application icon 408 corresponds to a secure application, such as secure application 240 in FIG. 2.

In response to user's finger 410 contacting display screen 404 at a location of secure application icon 408, full display screen fingerprint scanner 406 captures an image of the user's fingerprint. Full display screen fingerprint scanner 406 sends the user's captured fingerprint data to operating system 412 to authenticate the user. Operating system 412 may be, for example, operating system 220 in FIG. 2. In parallel with authenticating the user, operating system 412 launches the secure application corresponding to secure application icon 408 and logs in to the secure application using retrieved or generated authentication data, such as authentication data 238 in FIG. 2. After operating system 412 logs in to the secure application, the secure application displays content corresponding to the secure application. The content of the secure application may be, for example, balance information corresponding to a bank account owned by the user.

Figure 5:
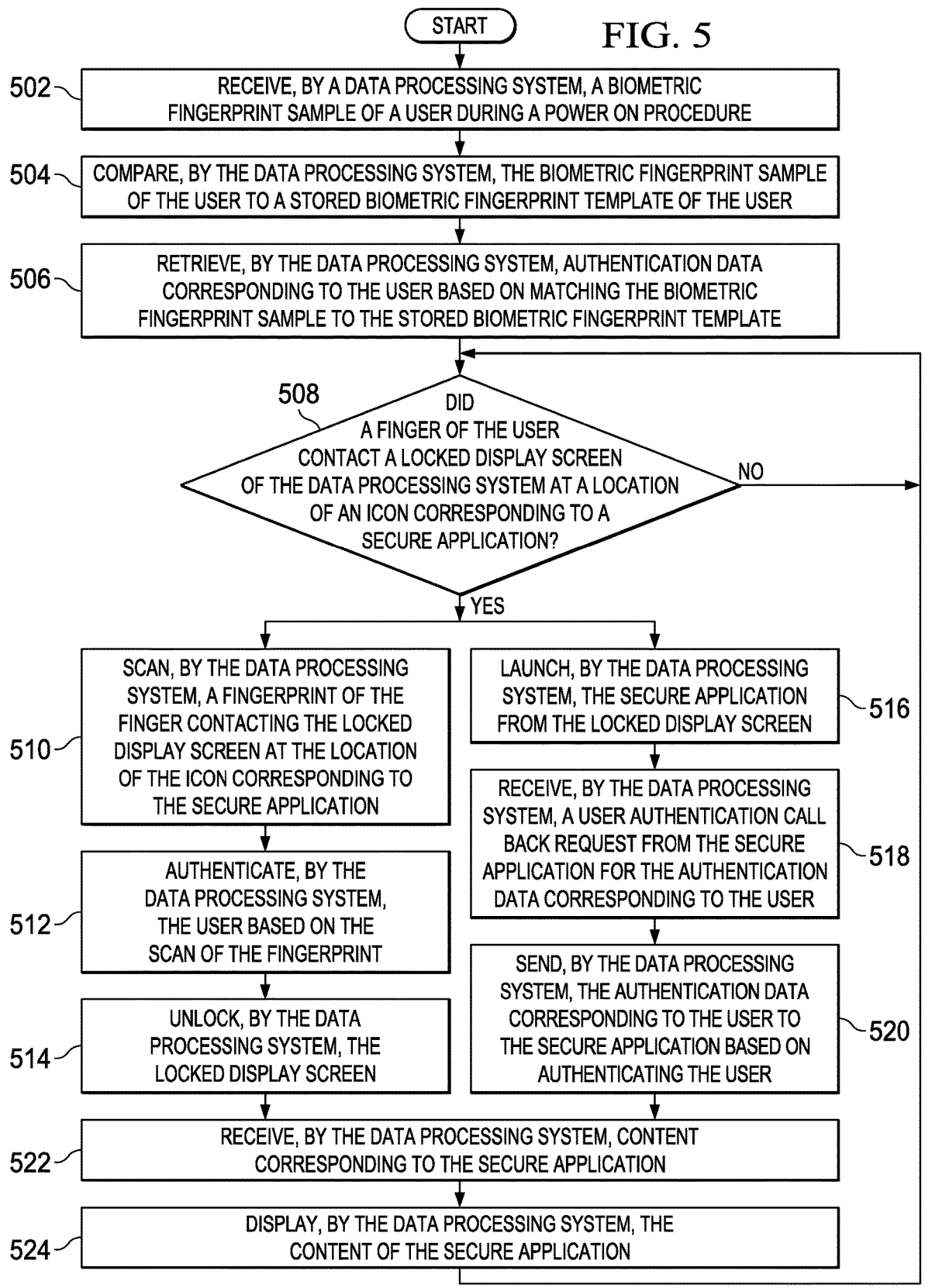
FIG. 5 is a flowchart illustrating a process for parallel user authentication and secure application launch in accordance with an illustrative embodiment.

With reference now to FIG. 5, a flowchart illustrating a process for parallel user authentication and secure application launch is shown in accordance with an illustrative embodiment. The process shown in FIG. 5 may be implemented in a data processing system, such as, for example, client 110 in FIG. 1, data processing system 200 in FIG. 2, electronic device 300 in FIG. 3, or electronic device 402 in FIG. 4.

The process begins when the data processing system receives a biometric fingerprint sample of a user during a power on procedure (step 502). The data processing system compares the biometric fingerprint sample of the user to a stored biometric fingerprint template of the user (step 504). In addition, the data processing system retrieves authentication data corresponding to the user based on matching the biometric fingerprint sample to the stored biometric fingerprint template (step 506). Alternatively, the data processing system may generate the authentication data in addition to, or instead of, retrieving the authentication data. The authentication data may be, for example, authentication credentials and/or biometric information corresponding to the user.

Subsequently, the data processing system makes a determination as to whether a finger of the user contacted a locked display screen of the data processing system at a location of an icon corresponding to a secure application (step 508). If the data processing system determines that a finger of the user did not contact the locked display screen of the data processing system at a location of an icon corresponding to a secure application, no output of step 508, then the process returns to step 508 where the data processing system waits for the user's finger to contact the locked display screen. If the data processing system determines that a finger of the user did contact the locked display screen of the data processing system at a location of an icon corresponding to a secure application, yes output of step 508, then the data processing system scans a fingerprint of the finger contacting the locked display screen at the location of the icon corresponding to the secure application (step 510). The data processing system also authenticates the user based on the scan of the fingerprint (step 512). In addition, the data processing system unlocks the locked display screen (step 514).

It should be noted that the data processing system performs steps 516-520 in parallel with performing steps 510-514. The data processing system launches the secure application from the locked display screen (step 516). The data processing system may launch the secure application from a shortcut or a most recently viewed application displayed on the locked display screen. Furthermore, the data processing system receives a user authentication call back request from the secure application for the authentication data corresponding to the user (step 518). Moreover, the data processing system sends the authentication data corresponding to the user to the secure application based on authenticating the user (step 520).

After performing steps 510-514 and steps 516-520 in parallel, the data processing system receives content corresponding to the secure application (step 522). The data processing system displays the content of the secure application (step 524). Thereafter, the process returns to step 508.

Figure 6:
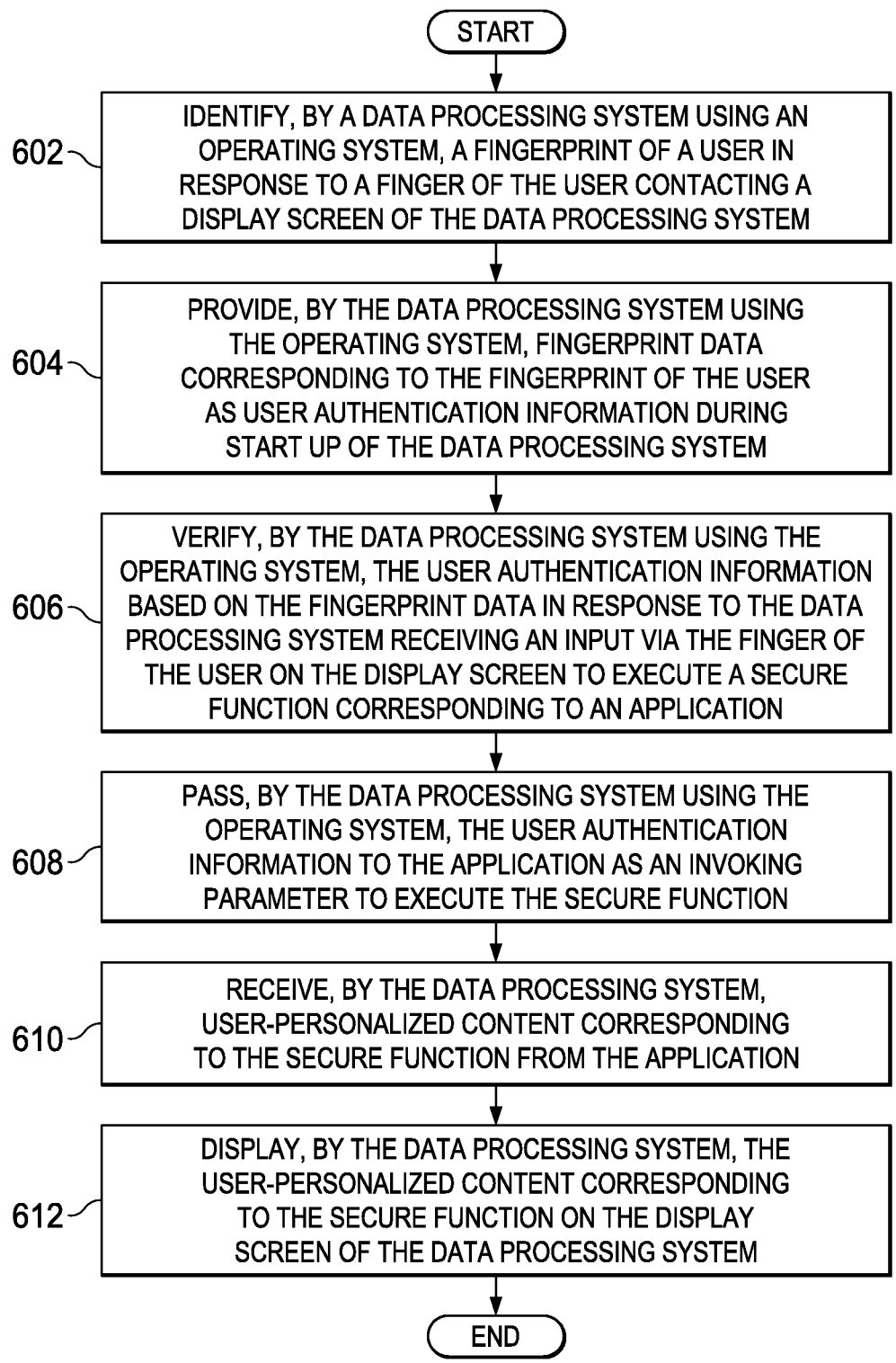
FIG. 6 is a flowchart illustrating a process for executing a secure function using an invoking parameter in accordance with an illustrative embodiment.

With reference now to FIG. 6, a flowchart illustrating a process for executing a secure function using an invoking parameter is shown in accordance with an illustrative embodiment. The process shown in FIG. 6 may be implemented in a data processing system, such as, for example, client 110 in FIG. 1, data processing system 200 in FIG. 2, electronic device 300 in FIG. 3, or electronic device 402 in FIG. 4.

The process begins when the data processing system, using an operating system, identifies a fingerprint of a user in response to a finger of the user contacting a display screen of the data processing system (step 602). The data processing system, using the operating system, provides fingerprint data corresponding to the fingerprint of the user as user authentication information during startup of the data processing system (step 604). The data processing system, using the operating system, verifies the user authentication information based on the fingerprint data in response to the data processing system receiving an input via the finger of the user on the display screen to execute a secure function corresponding to an application (step 606). A secure function requires user authentication prior to performance of the secure function.

The data processing system, using the operating system, passes the user authentication information to the application as an invoking parameter to execute the secure function (step 608). Subsequently, the data processing system receives user-personalized content corresponding to the secure function from the application (step 610). The data processing system displays the user-personalized content corresponding to the secure function on the display screen of the data processing system (step 612). Thereafter, the process terminates.

Thus, illustrative embodiments of the present invention provide a computer-implemented method, data processing system, and computer program product for providing single tap launch and login to a secure application using a whole display screen fingerprint scanning on a display screen of an electronic device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing single tap user authentication, launch and login to a secure application having restricted access requiring authentication for access thereto by a user, the computer-implemented method comprising:
    responsive to a data processing system receiving an input via a finger of the user on a display screen to execute the secure application, verifying, by the data processing system, user authentication information based on fingerprint data;
    responsive to verifying the user authentication information, launching, by the data processing system, the secure application using the user authentication information as an invoking parameter to execute the secure application;
    receiving, by the data processing system, content corresponding to the secure application in response to execution of the secure application, wherein the user is authenticated by verifying the user authentication information, the secure application is launched, and the user is logged into the secure application responsive to a single tap of the finger of the user on the display screen;
    responsive to the data processing system determining that the finger of the user contacted the display screen, scanning, by the data processing system, a fingerprint of the finger of the user contacting the display screen to obtain the fingerprint data; and
    responsive to the data processing system scanning the fingerprint, retrieving, by the data processing system, the user authentication information based on matching the fingerprint data to a stored biometric fingerprint template, wherein the user authentication information is specific to the secure application.

2. The computer-implemented method of claim 1 further comprising:
    responsive to the data processing system scanning the fingerprint, generating, by the data processing system, the user authentication information based on matching the fingerprint data to a stored biometric fingerprint template, wherein the user authentication information is specific to the secure application.

3. The computer-implemented method of claim 1, wherein the display screen is locked when the finger of the user contacts the display screen, and wherein the user authentication information is verified by the data processing system without unlocking the display screen.

4. The computer-implemented method of claim 1, wherein the display screen is locked when the finger of the user contacts the display screen, and further comprising:
    responsive to verifying the user authentication information, unlocking the display screen.

5. The computer-implemented method of claim 1 further comprising:
    displaying, by the data processing system, the content of the secure application in response to the secure application receiving the user authentication information.

6. The computer-implemented method of claim 1, wherein the data processing system utilizes an operating system of the data processing system to perform the verifying of the user authentication information and the launching of the secure application.

7. A data processing system for providing single tap user authentication, launch and login to a secure application having restricted access requiring authentication for access thereto by a user, the data processing system comprising:
    a bus system;
    a storage device connected to the bus system, wherein the storage device stores program instructions; and
    a processor connected to the bus system, wherein the processor executes the program instructions to:
    verify user authentication information based on fingerprint data responsive to the data processing system receiving an input via a finger of the user on a display screen to execute the secure application;
    launch the secure application using the user authentication information as an invoking parameter to execute the secure application responsive to verifying the user authentication information;
    receive content corresponding to the secure application in response to execution of the secure application, wherein the user is authenticated by verifying the user authentication information, the secure application is launched, and the user is logged into the secure application based on a single tap of the finger of the user on the display screen;
    scan a fingerprint of the finger of the user contacting the display screen to obtain the fingerprint data responsive to the data processing system determining that the finger of the user contacted the display screen; and
    retrieve the user authentication information based on matching the fingerprint data to a stored biometric fingerprint template responsive to scanning the fingerprint, wherein the user authentication information is specific to the secure application.

8. The data processing system of claim 7 further comprising:
    display the content of the secure application in response to the secure application receiving the user authentication information.

9. The data processing system of claim 7, wherein the data processing system utilizes an operating system of the data processing system to perform the verifying of the user authentication information and the launching of the secure application.

10. A computer program product for providing single tap user authentication, launch and login to a secure application having restricted access requiring authentication for access thereto by a user, the computer program product comprising a computer readable storage medium having program instructions embodied therewith, the program instructions executable by a data processing system to cause the data processing system to perform a method comprising:

verifying, by the data processing system, user authentication information based on fingerprint data responsive to the data processing system receiving an input via a finger of the user on a display screen to execute the secure application;

launching, by the data processing system, the secure application using the user authentication information as an invoking parameter to execute the secure application responsive to verifying the user authentication information;

receiving, by the data processing system, content corresponding to the secure application in response to execution of the secure application, wherein the user is authenticated by verifying the user authentication information, the secure application is launched, and the user is logged into the secure application responsive to a single tap of the finger of the user on the display screen;

scanning, by the data processing system, a fingerprint of the finger of the user contacting the display screen to obtain the fingerprint data responsive to the data processing system determining that the finger of the user contacted the display screen; and retrieving, by the data processing system, the user authentication information based on matching the fingerprint data to a stored biometric fingerprint template responsive to scanning the fingerprint, wherein the user authentication information is specific to the secure application.

11. The computer program product of claim 10, wherein the display screen is locked when the finger of the user contacts the display screen, and wherein the user authentication information is verified by the data processing system without unlocking the display screen.

12. The computer program product of claim 10, wherein the display screen is locked when the finger of the user contacts the display screen, and further comprising:

responsive to verifying the user authentication information, unlocking the display screen.

13. The computer program product of claim 10 further comprising:

displaying the content of the secure application in response to the secure application receiving the user authentication information.

14. The computer program product of claim 10, wherein the data processing system utilizes an operating system of the data processing system to perform the verifying of the user authentication information and the launching of the secure application.

\* \* \* \* \*